(12) United States Patent
Scheibel

(10) Patent No.: US 10,137,931 B2
(45) Date of Patent: Nov. 27, 2018

(54) REDUNDANT STEERING CONTROLS FOR AUTOMATED DRIVING

(71) Applicant: Jorg Scheibel, Lake Orion, MI (US)

(72) Inventor: Jorg Scheibel, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 237 days.

(21) Appl. No.: 15/287,424

(22) Filed: Oct. 6, 2016

(65) Prior Publication Data
US 2018/0099694 A1    Apr. 12, 2018

(51) Int. Cl.
| | |
|---|---|
| *B62D 11/02* | (2006.01) |
| *B60T 7/12* | (2006.01) |
| *B62D 11/00* | (2006.01) |
| *B62D 5/04* | (2006.01) |
| *B60T 1/10* | (2006.01) |
| *B62D 5/07* | (2006.01) |
| *B62D 9/00* | (2006.01) |
| *B60T 11/10* | (2006.01) |
| *B60T 13/04* | (2006.01) |

(Continued)

(52) U.S. Cl.
CPC .......... *B62D 11/02* (2013.01); *B60T 1/10* (2013.01); *B60T 7/12* (2013.01); *B60T 11/103* (2013.01); *B60T 13/04* (2013.01); *B60T 13/686* (2013.01); *B62D 5/0484* (2013.01); *B62D 5/07* (2013.01); *B62D 9/002* (2013.01); *B62D 11/003* (2013.01); *F16D 61/00* (2013.01); *B60T 2260/02* (2013.01)

(58) Field of Classification Search
None
See application file for complete search history.

(56) References Cited

U.S. PATENT DOCUMENTS

| | | | | |
|---|---|---|---|---|
| 2,347,241 A | * | 4/1944 | Boldt | B62D 11/08 180/6.3 |
| 3,530,951 A | * | 9/1970 | Beig | B62D 1/22 180/333 |

(Continued)

FOREIGN PATENT DOCUMENTS

| | | |
|---|---|---|
| CN | 102815335 A | 12/2012 |
| DE | 102014220440 A1 | 7/2015 |
| DE | 102015014882 A1 | 6/2016 |

OTHER PUBLICATIONS

International Search Report and the Written Opinion of the International Searching Authority dated Dec. 15, 2017 for corresponding PCT application No. PCT/US2017/055137.

*Primary Examiner* — Shelley Chen

(57) ABSTRACT

A steering system which is capable of being controlled by a redundant brake system, which includes a primary brake control module, a secondary brake control module, and a plurality of brake units controlled by the primary brake control module or the secondary brake control module. There is at least one hydraulic motor connected to a component of the steering system, and the fluid pressure in the hydraulic motor is controlled by the secondary brake control module. The wheels of the steering system are configured to make a right-hand turn when the secondary brake control module operates the hydraulic motor during a first mode of operation, and the wheels of the steering system are configured to make a left-hand turn when the secondary brake control module operates the hydraulic motor during a second mode of operation.

18 Claims, 3 Drawing Sheets

(51) Int. Cl.
*B60T 13/68* (2006.01)
*F16D 61/00* (2006.01)

(56) References Cited

U.S. PATENT DOCUMENTS

| | | | |
|---|---|---|---|
| 4,754,824 A * | 7/1988 | Olsson | B62D 11/08 180/6.2 |
| 2002/0005302 A1 * | 1/2002 | Hidaka | B62D 11/183 180/6.24 |

* cited by examiner

REDUNDANT STEERING CONTROLS FOR AUTOMATED DRIVING

FIELD OF THE INVENTION

The invention relates generally to a steering system which is controlled by a redundant brake control system, for an autonomous driving vehicle.

BACKGROUND OF THE INVENTION

Vehicles with autonomous driving capabilities are becoming increasingly common. Some vehicles are fully autonomous, and do not require the input of a driver. These types of vehicle may have different modes of operation, where in one mode of operation, the driver controls the vehicle, and in another mode of operation, the vehicle is operating in a fully autonomous driving mode, with no input from the driver. Furthermore, there are also vehicles which are used for transporting passengers or cargo, but do not have a driver, and are designed such that a driver never provides any type of input to control the vehicle. Therefore the operation of the vehicle, such as steering, acceleration, braking, and parking, are controlled by various components, such as control modules and the like. The control modules receive input from various devices, such as sensors, GPS, and the like, to determine what operations are to be performed based on certain parameters such as local speed limits, oncoming traffic signals, and the speed and location of nearby vehicles. With more vehicles being fully operational without the use of driver input, there is a need for the automated driving system of the vehicle to have various redundancies to ensure safe handling of the vehicle in fallback conditions.

Accordingly, there exists a need for a steering system which may be used as part of a fully autonomous vehicle, where the steering system is controlled by a redundant brake system that becomes active after failure of the primary steering system.

SUMMARY OF THE INVENTION

The present invention is a redundant steering system which is powered by components of a redundant brake system, where the redundant steering system is activated upon failure of the primary steering system.

In one embodiment, the present invention is a brake system operable for controlling a steering system, which includes a primary brake control module for controlling fluid pressure in the brake system, a secondary brake control module for controlling fluid pressure in the brake system independently of the primary brake control module, and a plurality of brake units controlled by the primary brake control module or the secondary brake control module, where the brake units are used for decelerating the vehicle. There is at least one hydraulic motor, and the fluid pressure in the hydraulic motor is controlled by the secondary brake control module. A steering system is used for steering a plurality of wheels of the vehicle, and the hydraulic motor is connected to a component of the steering system, such as a steering knuckle. A first fluid conduit is connected to and in fluid communication with the hydraulic motor and the secondary brake control module, and a second fluid conduit connected to and in fluid communication with the hydraulic motor and the secondary brake control module.

A virtual driver is in electrical communication with the primary brake control module and the secondary brake control module. The secondary brake control module controls the brake units based on input from the virtual driver when the secondary brake control module is active. During a first mode of operation, fluid is pumped from the secondary brake control module through the first fluid conduit to the hydraulic motor, and fluid is pumped from the hydraulic motor through the second fluid conduit to the secondary brake control module. During a second mode of operation, fluid is pumped from the secondary brake control module through the second fluid conduit to the hydraulic motor, and fluid is pumped from the hydraulic motor through the first fluid conduit to the secondary brake control module. During the first mode of operation the wheels are configured for making a right-hand turn, and during the second mode of operation, the wheels are configured for making a left-hand turn.

The wheels are configured to make a right-hand turn when the secondary brake control module operates the hydraulic motor during the first mode of operation, and the wheels are configured to make a left-hand turn when the secondary brake control module operates the hydraulic motor during the second mode of operation.

The secondary brake control module is active and controls the fluid pressure in the secondary brake system when there is a malfunction in the primary brake system.

In one embodiment, there is a first hydraulic motor connected to a first component of the steering system, the first hydraulic motor being connected to and in fluid communication with the first fluid conduit, and a second hydraulic motor connected to a second component of the steering system, the second hydraulic motor being connected to and in fluid communication with the second fluid conduit. During the first mode of operation, fluid is pumped from the secondary brake control module through the first fluid conduit to the first hydraulic motor to actuate the first hydraulic motor, and fluid is pumped from the second hydraulic motor, through the second fluid conduit, to the secondary brake control module. During the second mode of operation, fluid is pumped from the secondary brake control module through the second fluid conduit to the second hydraulic motor to actuate the second hydraulic motor, and fluid is pumped from the first hydraulic motor, through the first fluid conduit, to the secondary brake control module.

The brake system operable for controlling the steering system also includes a first brake unit and a second brake unit, both of which are part of the plurality of brake units. There is also a first brake conduit connected to and in fluid communication with the first fluid conduit, and the first brake conduit also connected to and in fluid communication with the secondary brake control module and the first brake unit such that during the first mode of operation, fluid is pumped from the secondary brake control module through the first fluid conduit to the first hydraulic motor to actuate the first hydraulic motor, and through the first brake conduit to actuate the first brake unit.

The brake system also includes a second brake conduit connected to and in fluid communication with the second fluid conduit, the second brake conduit also connected to and in fluid communication with the secondary brake control module and the second brake unit such that during the second mode of operation, fluid is pumped from the secondary brake control module through the second fluid conduit to the second hydraulic motor to actuate the second hydraulic motor, and through the second brake conduit to actuate the second brake unit.

In one embodiment, the first hydraulic motor and the first brake unit are actuated simultaneously during the first mode of operation, and the second hydraulic motor and the second brake unit are actuated simultaneously during the second mode of operation.

In one embodiment, the brake system which is operable for controlling the steering system also includes a third mode of operation. During the third mode of operation, fluid is pumped from the secondary brake control module through the first fluid conduit to the first hydraulic motor to actuate the first hydraulic motor, and through the first brake conduit to actuate the first brake unit, and fluid is also pumped from the secondary brake control module through the second fluid conduit to the second hydraulic motor to actuate the second hydraulic motor, and through the second brake conduit to actuate the second brake unit. During the third mode of operation, the first hydraulic motor, the first brake unit, the second hydraulic motor, and the second brake unit are actuated simultaneously, such that the vehicle decelerates, and moves in a substantially straight direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
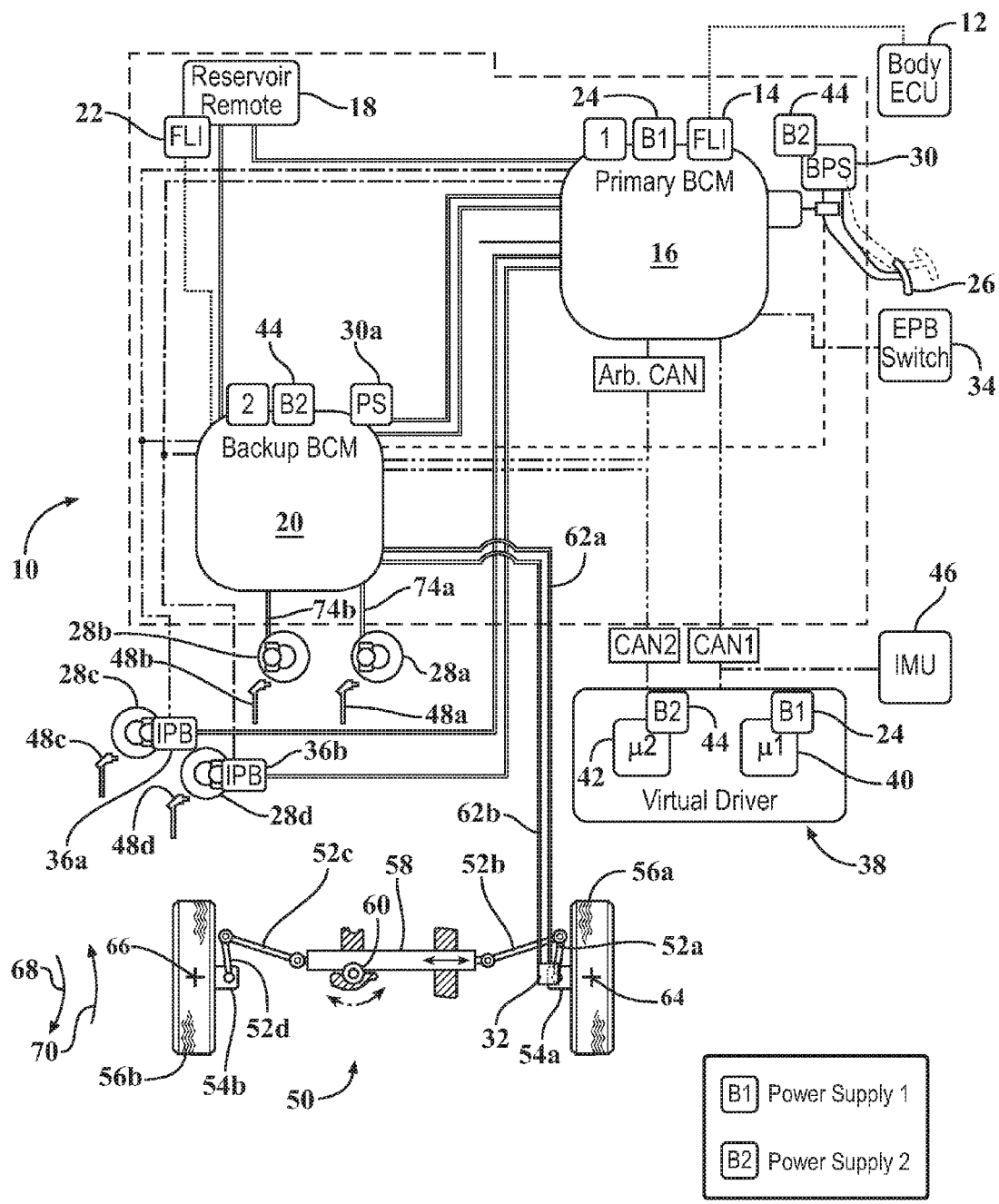
FIG. 1 is a diagram of a first embodiment of a brake system used to control a steering system, according to embodiments of the present invention.

A diagram of a braking system used to provide redundant controls for a steering system according to a first embodiment of the present invention is shown in FIG. 1, generally at 10. The system 10 includes a body electronic control unit (ECU) 12 in electrical communication with a Fluid Level Indicator (FLI) 14 connected to a first, or primary, brake control module (BCM) 16. The BCM 16 is in fluid communication with a reservoir 18, and the reservoir 18 is also in fluid communication with a second, or backup BCM 20. There is also a second FLI 22 connected to the reservoir 18, and in electrical communication with the backup BCM 20. Power is supplied to the primary BCM 16 by a first power supply 24, and there is a brake pedal 26 mechanically connected to the primary BCM 16. The primary BCM 16 is in fluid communication with one or more brake units 28a, 28b,28c,28d such that when the operator, or driver, of the vehicle applies force to the brake pedal 26, the primary BCM 16 detects the force applied to the brake pedal 26, which results in the actuation of one or more brake units 28a,28b,28c,28d. The change in position of the brake pedal 26 is detected by the primary BCM 16 through the use of a position sensor 30. The position sensor 30 is also in electrical communication with the backup BCM 20, such that the backup BCM 20 also receives a signal from the position sensor 30 indicating the position of the brake pedal 26.

The primary BCM 16 is also in electrical communication and fluid communication with the backup BCM 20, and the primary BCM 16 is also in fluid communication with a pressure sensor 30a. The backup BCM 20 is also in fluid communication with the first two brake unit units 28a,28b and also actuates a bi-directional hydraulic motor 32, which is part of a steering system, shown generally at 50.

The system 10 also includes several components to perform a parking brake function. There is an electronic parking brake (EPB) switch 34 in electrical communication with the primary BCM 16, and the primary BCM 16 and backup BCM 20 are both in electrical communication with a first parking brake unit 36a and a second parking brake unit 36b.

The system 10 may also be controlled by a virtual driver, when the vehicle is operating in an autonomous driving mode. The virtual driver is shown in FIG. 1, generally at 38, where the virtual driver 38 is in electrical communication with both BCM 16,20. The virtual driver 38 includes a primary controller 40 and a secondary, or redundant, controller 42. The primary controller 40 is powered by the first power supply 24, and there is a second power supply 44 which supplies power to the secondary controller 42, as well as the backup BCM 20, and the position sensor 30. There is also an Inertial Measurement Unit (IMU) 46 in electrical communication with both the primary BCM 16 and the primary controller 40 of the virtual driver 38.

There may also optionally be wheel speed sensors 48a, 48b,48c,48d used to detect the speed of each wheel of the vehicle.

In addition to the bi-directional hydraulic motor 32, the steering system 50 includes a plurality of linkage arms 52a,52b,52c,52d. The motor 32 is connected to a component of the steering system 50, and used to control the steering system 50 when the vehicle is operating in an autonomous driving mode, and there is a failure somewhere in the primary controls of the steering system 50. In this embodiment, the component is a steering knuckle 54a, but it is within the scope of the invention that the motor 32 may be attached to other components of the steering system 50 to control the steering system 50. The first linkage arm 54a is fixedly connected to the first steering knuckle 54a, and there is a first wheel 56a mounted to the first steering knuckle 54a. A second linkage arm 52b is pivotally connected to the first linkage arm 52a and a steering rack 58 which is in mesh with a pinion gear 60.

There is a third linkage arm 52c pivotally connected to the steering rack 58 and a fourth linkage arm 52d. The fourth linkage arm 52d is fixedly connected to a second steering knuckle 54b, and there is a second wheel 56b mounted to the second steering knuckle 54b.

There is also a first fluid conduit 62a and a second fluid conduit 62b, both of which are connected to and in fluid communication with the backup BCM 20 and the motor 32. During manual driving mode, when the vehicle driver is operating the vehicle, the driver rotates the steering wheel (not shown) such that other various steering components rotate the pinion gear 60 to move the steering rack 58, which moves the linkage arms 52a,52b and rotates the first steering knuckle 54a and first wheel 56a about a first axis 64. Movement of the steering rack 58 also moves the linkage arms 52c,52d and rotates the second steering knuckle 54b and second wheel 56b about a second axis 66. The knuckles 54a,54b and wheels 56a,56b are able to be rotated in a first direction, as indicated by a first arrow 68, to configure the wheels 56a,56b for making a right-hand turn, and the knuckles 54a,54b and wheels 56a,56b are able to be rotated in a second direction, as indicated by a second arrow 70, to configure the wheels 56a,56b for making a left-hand turn.

There are also instances where the vehicle is operating in an autonomous driving mode, where the configuration of the wheels 56a,56b is controlled by the virtual driver 38. However, if there is a situation where a failure occurs in the autonomous driving mode, various redundancies in the brake system 10 and steering system 50 may need to be activated to ensure safe and proper handling of the vehicle. The vehicle includes a redundancy operating mode, which is used to control the steering system 50 when there is a failure elsewhere in the vehicle. In the redundancy operating mode, instead of the pinion gear 60 being rotated to move the steering rack 58, the motor 32 is actuated to rotate the first steering knuckle 54a. Because of the connection between first steering knuckle 54a, the first two linkage arms 52a, 52b, the steering rack 58, the second two linkage arms 52c,52d, and the second steering knuckle 54b, all of these components move together, such that when the first steering knuckle 54a is rotated, the first two linkage arms 52a,52b, the steering rack 58, and the second two linkage arms 52c,52d move relative to one another, causing the second steering knuckle 54b to rotate as well. More specifically, the backup BCM 20 is used to transfer fluid through one of the fluid conduits 62a,62b to control the motor 32. The backup BCM 20 is able to control the motor 32 in two modes of operation. During a first mode of operation, the backup BCM 20 pumps fluid through the first fluid conduit 62a. Because the motor 32 pumps fluid, the fluid pumped by the motor 32 enters the second fluid conduit 62b such that the second fluid conduit 62b acts as a return conduit, where fluid exiting the motor 32 flows back towards the backup BCM 20. During a second mode of operation, the backup BCM 20 pumps fluid through the second fluid conduit 62b. Because the motor 32 in FIG. 1 is a bi-directional hydraulic motor 32, fluid entering the motor 32 from the second fluid conduit 62b, is pumped out of the motor 32 into the first fluid conduit 62a, such that the first fluid conduit 62a acts as a return conduit, where fluid exiting the motor 32 flows back towards the backup BCM 20. Because the motor 32 is a bi-directional hydraulic motor 32, there is a pre-determined amount of fluid needed in the system 10, since the fluid is pumped between the backup BCM 20 and the motor 32 during the two modes of operation. During the first mode of operation, the motor 32 is actuated to rotate the knuckles 54a,54b and wheels 56a,56b in the first direction 68, to configure the wheels 56a,56b for making a right-hand turn. During the second mode of operation, the knuckles 54a,54b and wheels 56a,56b are rotated in the second direction 70, to configure the wheels 56a,56b for making a left-hand turn.

The redundancy operating mode is active when there is some failure that occurs when the vehicle is operating in the autonomous driving mode, and the primary controls of the steering system 50 are not working, which may result from a failure in the first power supply 24. The redundant controller 42 of the virtual driver 38 is used to control the backup BCM 20, and therefore the steering system 50 when the vehicle is operating in the redundancy operating mode. This helps to ensure that even if there is a failure during the autonomous driving mode, control of the vehicle may still be maintained.

Figure 2:
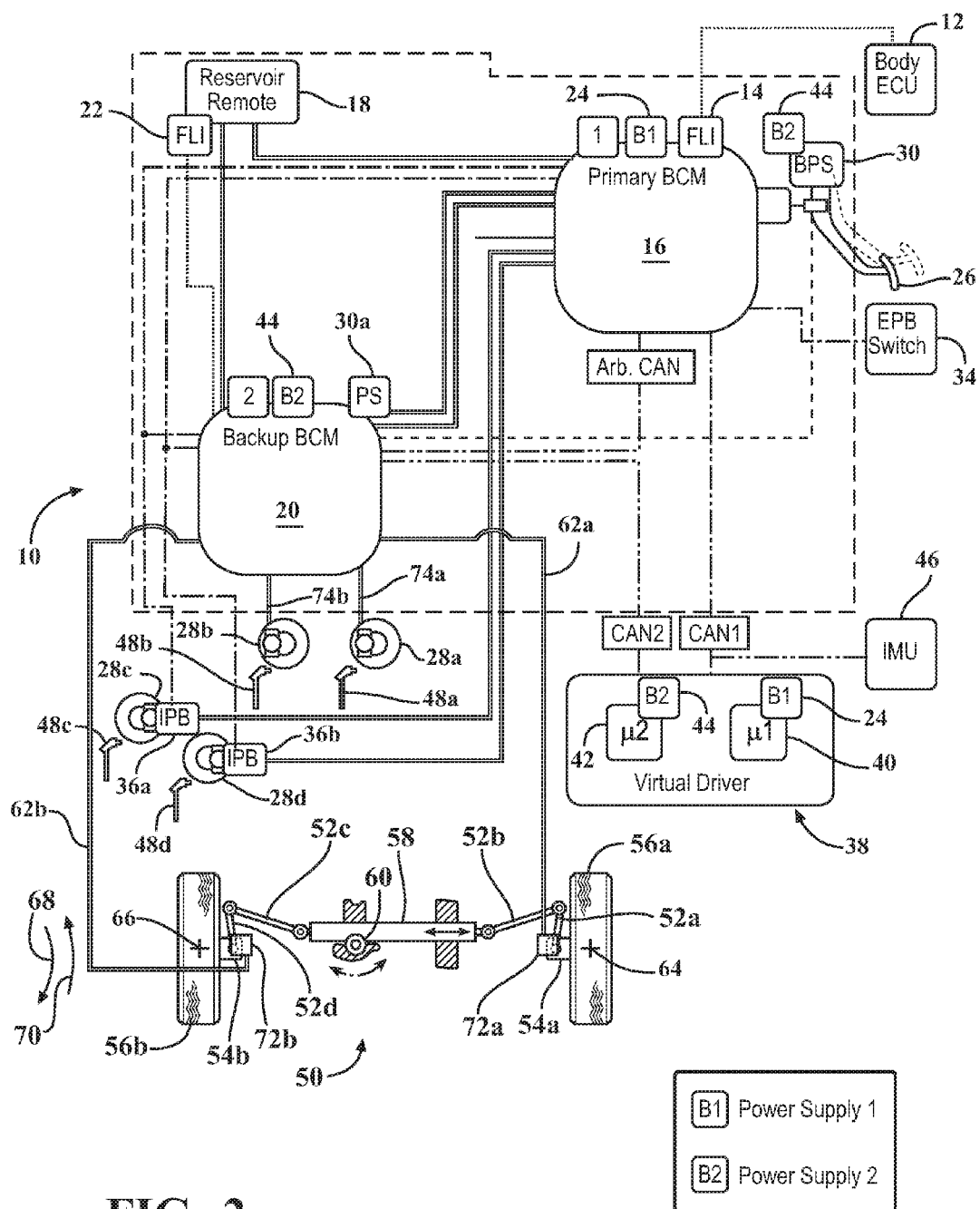
FIG. 2 is a diagram of a second embodiment of a brake system used to control a steering system, according to embodiments of the present invention.

Another embodiment of the present invention is shown in FIG. 2, with like numbers referring to like elements. In this embodiment, there is no bi-directional hydraulic motor 32, but rather there is a first uni-directional hydraulic motor 72a attached to the first steering knuckle 54a, and a second uni-directional hydraulic motor 72b attached to the second steering knuckle 54b. In this embodiment, the first fluid conduit 62a is connected to and in fluid communication with the first uni-directional hydraulic motor 72a, and the second fluid conduit 62b is connected to and in fluid communication with the second uni-directional hydraulic motor 72b.

When the steering system 50 is being operated in the redundancy operating mode, there is again the first mode of operation, where the wheels 56a,56b are configured for making a right-hand turn, and a second mode of operation, where the wheels 56a,56b are configured for making a left-hand turn. Each of the uni-directional hydraulic motors 72a,72b is able to receive fluid from the backup BCM 20, and are also able to pump fluid to the backup BCM 20, depending upon whether the backup BCM 20 is operating in the first mode of operation, or the second mode of operation.

During the first mode of operation, the backup BCM 20 pumps fluid through the first fluid conduit 62a to the first uni-directional hydraulic motor 72a, such that the motor 72a rotates the first steering knuckle 54a in the first direction 68. This results in movement of the linkage arms 52a,52b,52c, 52d and the steering rack 58 such that the second steering knuckle 54b is also rotated in the first direction 68. The rotation of the knuckles 54a,54b and wheels 56a,56b in the first direction 68 configures the wheels 56a,56b for making a right-hand turn. As this occurs, the second uni-directional hydraulic motor 72b is also rotated by the second steering knuckle 54b such that fluid in the second uni-directional hydraulic motor 72b is pumped through the second fluid conduit 62b back into the backup BCM 20. In the first mode of operation, the second fluid conduit 62b functions as a return conduit in a similar manner to the previous embodiment.

During the second mode of operation, the backup BCM 20 pumps fluid through the second fluid conduit 62b to the second uni-directional hydraulic motor 72b, such that the motor 72b rotates the second steering knuckle 54b in the second direction 70. This results in movement of the linkage arms 52a,52b,52c,52d and the steering rack 58 such that the first steering knuckle 54a is also rotated in the second direction 70. The rotation of the knuckles 54a,54b and wheels 56a,56b in the second direction 70 configures the wheels 56a,56b for making a left-hand turn. As this occurs, the first uni-directional hydraulic motor 72a is also rotated by the first steering knuckle 54a such that fluid in the first uni-directional hydraulic motor 72a is pumped through the first fluid conduit 62a back into the backup BCM 20. In the second mode operation, the first fluid conduit 62a functions as a return conduit in a similar manner to the previous embodiment.

Figure 3:
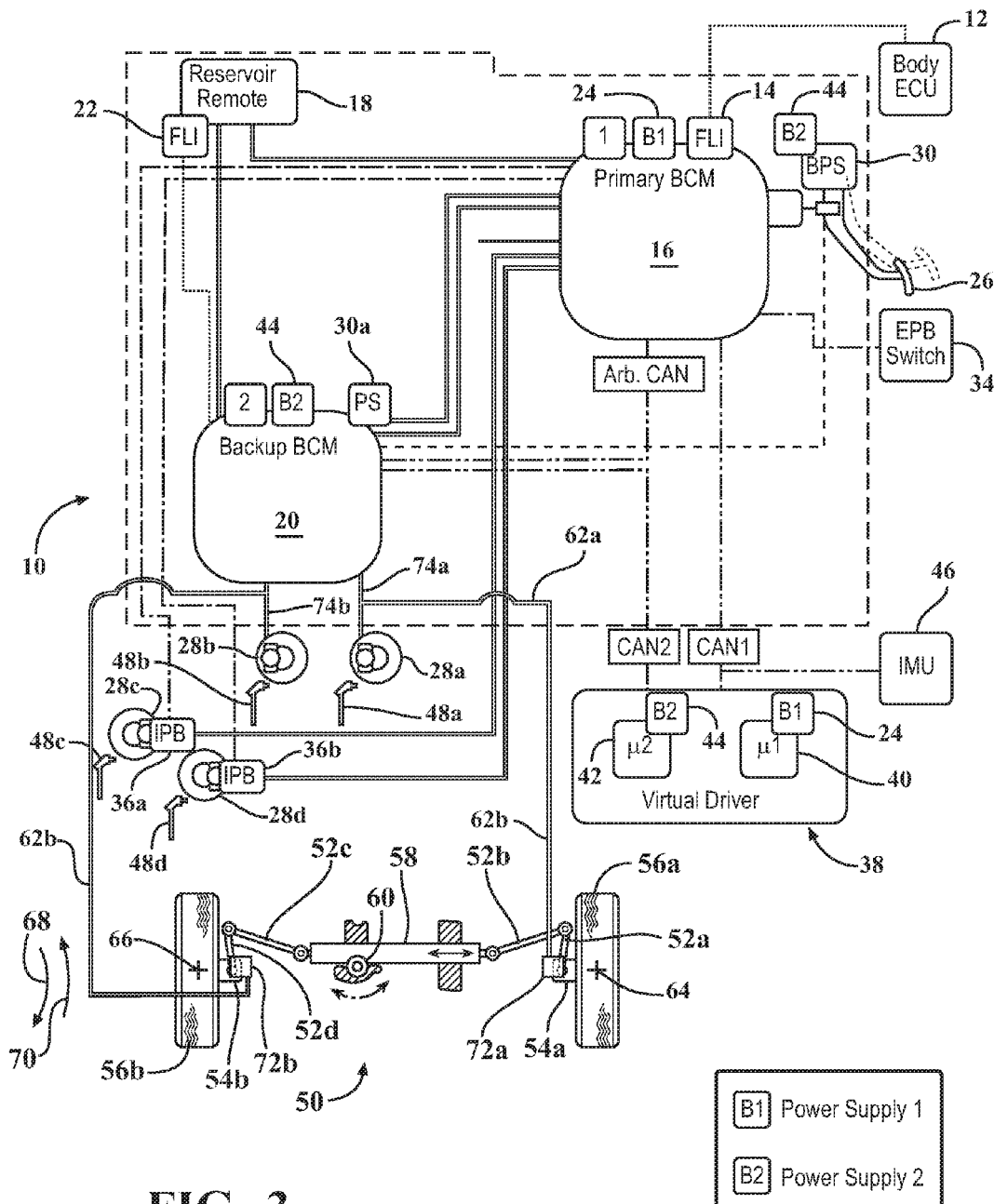
FIG. 3 is a diagram of a third embodiment of a brake system used to control a steering system, according to embodiments of the present invention.

A third embodiment of the present invention is shown in FIG. 3, with like numbers referring to like elements. In this embodiment, there is a first brake conduit 74a connected to and in fluid communication with the backup BCM 20 and the first brake unit 28a. There is also a second brake conduit 74b connected to and in fluid communication with the backup BCM 20 and the second brake unit 28b. The first fluid conduit 62a is connected to and in fluid communication with the first brake conduit 74a, and the second fluid conduit 62b is connected to and in fluid communication with the second brake conduit 74b. This embodiment also includes the uni-directional hydraulic motors 72a,72b, such that the motors 72a,72b and the steering system 50 function in the same manner as the embodiment shown in FIG. 2. Again, during the first mode of operation, the wheels 56*a*,56*b* are configured for making a right-hand turn, and during the second mode of operation, the wheels 56*a*,56*b* are configured for making a left-hand turn. However, in this embodiment, during the first mode of operation the backup BCM 20 pumps fluid through the first brake conduit 74*a*, such that fluid is also pumped through the first fluid conduit 62*a*. As this occurs, both the first brake unit 28*a* is actuated, and the first uni-directional hydraulic motor 72*a* is also actuated such that the wheels 56*a*,56*b* are configured for making a right-hand turn in the same manner as described in the embodiment shown in FIG. 2. This simultaneously causes the vehicle to brake and decrease speed, as well as steer to the right. In this embodiment, the second fluid conduit 62*b* also functions as a return conduit, as described in the previous embodiment. During the second mode of operation, the backup BCM 20 pumps fluid through the second brake conduit 74*b*, such that fluid is also pumped through the second fluid conduit 62*b*. As this occurs, both the second brake unit 28*b* is actuated, and the second uni-directional hydraulic motor 72*b* is also actuated such that the wheels 56*a*,56*b* are configured for making a left-hand turn. This simultaneously causes the vehicle to brake and decrease speed, as well as steer to the left. In this embodiment, the first fluid conduit 62*b* also functions as a return conduit, as described in the previous embodiment.

The third embodiment of the present invention also includes a third mode of operation. In this embodiment, BCM 20 pumps fluid through both fluid conduits 62*a*,62*b* and both brake conduits 74*a*,74*b* such that both of the brake units 28*a*,28*b* are actuated, and fluid is pumped to each uni-directional hydraulic motor 72*a*,72*b*. However, when fluid is pumped to each uni-directional hydraulic motor 72*a*,72*b*, the motors 72*a*,72*b* work against each other such that the wheels 56*a*,56*b* remain in the position shown in FIG. 3, and the vehicle moves in a substantially straight direction while braking. Furthermore, there is also a variation to the third mode of operation, where varying amounts of fluid are pumped by the BCM 20 to the fluid conduits 62*a*,62*b* and brake conduits 74*a*,74*b*, to control the steering system 50 and brake units 28*a*,28*b* of the vehicle, such that there may be varying degrees of turning and braking, where the vehicle may brake slow or fast, and the vehicle may also turn slightly or sharply.

Although the variations in FIGS. 2-3 are shown, it is within the scope of the invention that other configurations may be used. With all of the embodiments, the backup BCM 20 may be used to control the steering system 50 for an indefinite period of time, or a defined period of time. In one embodiment, the backup BCM 20 is used to control the steering system 50 for as long as desired, such that the vehicle may reach a specific destination. In another embodiment, the backup BCM 20 may be used to control the steering system 50 long enough to bring the vehicle to a controlled stop, such as the side of a road, or a parking lot, after the primary controls of the steering system 50 have failed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
  a brake system operable for controlling a steering system, including:
    a primary brake control module for controlling fluid pressure in the brake system;
    a secondary brake control module for controlling fluid pressure in the brake system independently of the primary brake control module;
    at least one brake unit controlled by the primary brake control module or the secondary brake control module, the least one brake unit used for decelerating a vehicle;
    at least one hydraulic motor controlled by the secondary brake control module;
    a steering system used for steering the vehicle, the at least one hydraulic motor being part of the steering system;
    at least one wheel being part of the steering system;
    a virtual driver in electrical communication with the primary brake control module and the secondary brake control module;
    a first mode of operation, the at least one wheel being configured to make a right-hand turn during the first mode of operation; and
    a second mode of operation, the at least one wheel being configured to make a left-hand turn during the second mode of operation;
    wherein the virtual driver is able to send commands to the secondary brake control module such that the secondary brake control module operates the at least one hydraulic motor in the first mode of operation to make the right-hand turn, and the secondary brake control module operates the at least one hydraulic motor in the second mode of operation to make the left-hand turn.

2. The apparatus of claim 1, further comprising:
  a first fluid conduit connected to and in fluid communication with the at least one hydraulic motor; and
  a second fluid conduit connected to and in fluid communication with the at least one hydraulic motor;
  wherein during the first mode of operation, fluid is pumped from the secondary brake control module through the first fluid conduit to the at least one hydraulic motor, and fluid is pumped from the at least one hydraulic motor through the second fluid conduit to the secondary brake control module, and during the second mode of operation, fluid is pumped from the secondary brake control module through the second fluid conduit to the at least one hydraulic motor, and fluid is pumped from the at least one hydraulic motor through the first fluid conduit to the secondary brake control module.

3. The apparatus of claim 2, the at least one hydraulic motor further comprising:
  a first hydraulic motor connected to a first component of the steering system, the first hydraulic motor being connected to and in fluid communication with the first fluid conduit; and
  a second hydraulic motor connected to a second component of the steering system, the second hydraulic motor being connected to and in fluid communication with the second fluid conduit;
  wherein during the first mode of operation, fluid is pumped from the secondary brake control module through the first fluid conduit to the first hydraulic motor to actuate the first hydraulic motor, and fluid is pumped from the second hydraulic motor, through the second fluid conduit, to the secondary brake control module, and during the second mode of operation, fluid is pumped from the secondary brake control module through the second fluid conduit to the second hydraulic motor to actuate the second hydraulic motor, and fluid is pumped from the first hydraulic motor, through the first fluid conduit, to the secondary brake control module.

4. The apparatus of claim 3, further comprising:
the at least one brake unit further comprising a first brake unit;
a first brake conduit connected to and in fluid communication with the first fluid conduit, the first brake conduit also connected to and in fluid communication with the secondary brake control module and the first brake unit such that during the first mode of operation, fluid is pumped from the secondary brake control module through the first fluid conduit to the first hydraulic motor to actuate the first hydraulic motor, and through the first brake conduit to actuate the first brake unit;
the at least one brake unit further comprising a second brake unit; and
a second brake conduit connected to and in fluid communication with the second fluid conduit, the second brake conduit also connected to and in fluid communication with the secondary brake control module and the second brake unit such that during the second mode of operation, fluid is pumped from the secondary brake control module through the second fluid conduit to the second hydraulic motor to actuate the second hydraulic motor, and through the second brake conduit to actuate the second brake unit;
wherein during the first mode of operation, the first hydraulic motor and the first brake unit are actuated simultaneously, and during the second mode of operation, the second hydraulic motor and the second brake unit are actuated simultaneously.

5. The apparatus of claim 4, further comprising a third mode of operation, wherein during the third mode of operation, fluid is pumped from the secondary brake control module through the first fluid conduit to the first hydraulic motor to actuate the first hydraulic motor, and through the first brake conduit to actuate the first brake unit, and fluid is also pumped from the secondary brake control module through the second fluid conduit to the second hydraulic motor to actuate the second hydraulic motor, and through the second brake conduit to actuate the second brake unit.

6. The apparatus of claim 4, wherein during the third mode of operation, the first hydraulic motor, the first brake unit, the second hydraulic motor, and the second brake unit are actuated simultaneously, such that the vehicle decelerates, and moves in a substantially straight direction.

7. A brake system operable for controlling a steering system, comprising:
a primary brake control module for controlling fluid pressure in the brake system;
a secondary brake control module for controlling fluid pressure in the brake system independently of the primary brake control module;
a plurality of brake units controlled by the primary brake control module or the secondary brake control module, the plurality of brake units used for decelerating the vehicle;
at least one hydraulic motor, the fluid pressure in the at least one hydraulic motor controlled by the secondary brake control module;
a steering system used for steering the vehicle, the at least one hydraulic motor connected to a component of the steering system;
a plurality of wheels being part of the steering system;

a first fluid conduit connected to and in fluid communication with the at least one hydraulic motor and the secondary brake control module; and
a second fluid conduit connected to and in fluid communication with the at least one hydraulic motor and the secondary brake control module;
a virtual driver in electrical communication with the primary brake control module and the secondary brake control module;
a first mode of operation, during the first mode of operation, fluid is pumped from the secondary brake control module through the first fluid conduit to the at least one hydraulic motor, and fluid is pumped from the at least one hydraulic motor through the second fluid conduit to the secondary brake control module; and
a second mode of operation, during the second mode of operation, fluid is pumped from the secondary brake control module through the second fluid conduit to the at least one hydraulic motor, and fluid is pumped from the at least one hydraulic motor through the first fluid conduit to the secondary brake control module;
wherein the plurality of wheels are configured to make a right-hand turn when the secondary brake control module operates the at least one hydraulic motor during the first mode of operation, and the plurality of wheels are configured to make a left-hand turn when the secondary brake control module operates the at least one hydraulic motor during the second mode of operation.

8. The brake system operable for controlling a steering system of claim 7, wherein the secondary brake control module is active and controls the fluid pressure in the secondary brake system when there is a malfunction in the primary brake system.

9. The brake system operable for controlling a steering system of claim 7, the at least one hydraulic motor further comprising:
a first hydraulic motor connected to a first component of the steering system, the first hydraulic motor being connected to and in fluid communication with the first fluid conduit; and
a second hydraulic motor connected to a second component of the steering system, the second hydraulic motor being connected to and in fluid communication with the second fluid conduit;
wherein during the first mode of operation, fluid is pumped from the secondary brake control module through the first fluid conduit to the first hydraulic motor to actuate the first hydraulic motor, and fluid is pumped from the second hydraulic motor, through the second fluid conduit, to the secondary brake control module, and during the second mode of operation, fluid is pumped from the secondary brake control module through the second fluid conduit to the second hydraulic motor to actuate the second hydraulic motor, and fluid is pumped from the first hydraulic motor, through the first fluid conduit, to the secondary brake control module.

10. The brake system operable for controlling a steering system of claim 9, further comprising:
a first brake unit, the first brake unit being one of the plurality of brake units;
a first brake conduit connected to and in fluid communication with the first fluid conduit, the first brake conduit also connected to and in fluid communication with the secondary brake control module and the first brake unit such that during the first mode of operation, fluid is pumped from the secondary brake control module through the first fluid conduit to the first hydraulic motor to actuate the first hydraulic motor, and through the first brake conduit to actuate the first brake unit;

a second brake unit, the second brake unit being one of the plurality of brake units; and a second brake conduit connected to and in fluid communication with the second fluid conduit, the second brake conduit also connected to an in fluid communication with the secondary brake control module and the second brake unit such that during the second mode of operation, fluid is pumped from the secondary brake control module through the second fluid conduit to the second hydraulic motor to actuate the second hydraulic motor, and through the second brake conduit to actuate the second brake unit;

wherein during the first mode of operation, the first hydraulic motor and the first brake unit are actuated simultaneously, and during the second mode of operation, the second hydraulic motor and the second brake unit are actuated simultaneously.

11. The brake system operable for controlling a steering system of claim 10, further comprising a third mode of operation, wherein during the third mode of operation, fluid is pumped from the secondary brake control module through the first fluid conduit to the first hydraulic motor to actuate the first hydraulic motor, and through the first brake conduit to actuate the first brake unit, and fluid is also pumped from the secondary brake control module through the second fluid conduit to the second hydraulic motor to actuate the second hydraulic motor, and through the second brake conduit to actuate the second brake unit.

12. The brake system operable for controlling a steering system of claim 11, wherein during the third mode of operation, the first hydraulic motor, the first brake unit, the second hydraulic motor, and the second brake unit are actuated simultaneously, such that the vehicle decelerates, and moves in a substantially straight direction.

13. The brake system operable for controlling a steering system of claim 10, wherein the secondary brake control module controls the first brake unit and the second brake unit based on input from the virtual driver when the secondary brake control module is active.

14. A method for controlling a steering system with a redundant brake system of a vehicle, comprising the steps of:

providing a primary brake control module;
providing a secondary brake control module;
providing a plurality of brake units controlled by the primary brake control module or the secondary brake control module;
providing a steering system;
providing a plurality of wheels being part of the steering system;
providing at least one hydraulic motor controlled by the secondary brake control module, the at least one hydraulic motor being connected to at least one component of the steering system;
providing a virtual driver in electrical communication with the primary brake control module and the secondary brake control module;
providing a first mode of operation; and
providing a second mode of operation;
sending commands to the secondary brake control module from the virtual driver to operate the at least one hydraulic motor in the first mode of operation or the second mode of operation;
configuring the plurality of wheels to make a right-hand turn during the first mode of operation;
configuring the plurality of wheels to make a left-hand turn during the second mode of operation.

15. The method of claim 14, further comprising the steps of:

providing a first fluid conduit connected to and in fluid communication with the at least one hydraulic motor; and
providing a second fluid conduit connected to and in fluid communication with the at least one hydraulic motor;
pumping fluid from the secondary brake control module through the first fluid conduit to the at least one hydraulic motor during the first mode of operation;
pumping fluid from the at least one hydraulic motor through the second fluid conduit to the secondary brake control module during the first mode of operation;
pumping fluid from the secondary brake control module through the second fluid conduit to the at least one hydraulic motor during the first mode of operation;
pumping fluid from the at least one hydraulic motor through the first fluid conduit to the secondary brake control module during the second mode of operation.

16. The method of claim 15, further comprising the steps of:

providing the at least one hydraulic motor to include a first hydraulic motor connected to a first component of the steering system;
providing the at least one hydraulic motor to include a second hydraulic motor connected to a second component of the steering system;
pumping fluid from the secondary brake control module through the first fluid conduit to the first hydraulic motor to actuate the first hydraulic motor, such that fluid from the second hydraulic motor is pumped through the second fluid conduit and to the secondary brake control module during the first mode of operation;
pumping fluid from the secondary brake control module through the second fluid conduit to the second hydraulic motor to actuate the second hydraulic motor, such that fluid is pumped from the first hydraulic motor, through the first fluid conduit, and to the secondary brake control module during the second mode of operation.

17. The method of claim 16, further comprising the steps of:

providing the plurality of brake units to include a first brake unit;
providing the plurality of brake units to include a second brake unit;
providing a first brake conduit connected to and in fluid communication with the secondary brake control module and the first brake unit, the first fluid conduit also being connected to and in fluid communication with the first brake conduit;
providing a second brake conduit connected to an in fluid communication with the secondary brake control module and the second brake unit, the second fluid conduit also being connected to and in fluid communication with the second brake conduit;
pumping fluid from the secondary brake control module through the first fluid conduit to the first hydraulic motor and the first brake conduit, such that the first hydraulic motor and the first brake unit are actuated simultaneously during the first mode of operation;

pumping fluid from the secondary brake control module through the second fluid conduit to the second hydraulic motor and the second brake conduit, such that the second hydraulic motor and the second brake unit are actuated simultaneously during the second mode of operation.

18. The method of claim 17, further comprising the steps of:
providing a third mode of operation;
actuating the first hydraulic motor, the second hydraulic motor, the first brake unit, and the second brake unit simultaneously during the third mode of operation such that the vehicle decelerates along a substantially straight direction.

* * * * *